(12) United States Patent
Shyu et al.

(10) Patent No.: US 7,957,081 B2
(45) Date of Patent: Jun. 7, 2011

(54) OPTICAL GLASS LENS SET AND MANUFACTURING METHOD THEREOF

(75) Inventors: San-Woei Shyu, Taipei (TW); Chih-Hsiung Huang, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 48 days.

(21) Appl. No.: 12/369,483

(22) Filed: Feb. 11, 2009

(65) Prior Publication Data

US 2009/0231688 A1   Sep. 17, 2009

(30) Foreign Application Priority Data

Mar. 11, 2008   (TW) .............................. 97108485 A

(51) Int. Cl.
G02B 7/02 (2006.01)
(52) U.S. Cl. ........................................ 359/811; 359/819
(58) Field of Classification Search .......... 359/808–823, 359/827, 830, 718, 719, 726–728, 649–700
See application file for complete search history.

(56) References Cited

U.S. PATENT DOCUMENTS

| 5,257,145 | A | * | 10/1993 | Kanazawa et al. | ............. | 359/819 |
| 5,555,480 | A | * | 9/1996 | Tanaka et al. | ................. | 359/822 |
| 5,699,201 | A | * | 12/1997 | Lee | ................. | 359/708 |
| 5,923,805 | A | | 7/1999 | Anderson et al. | | |
| 5,975,882 | A | * | 11/1999 | Nomura et al. | ................. | 451/42 |
| 6,144,500 | A | * | 11/2000 | Iwaki et al. | ..................... | 359/719 |
| 6,449,107 | B2 | * | 9/2002 | Tachibe et al. | ................. | 359/819 |
| 6,710,945 | B1 | * | 3/2004 | Miranda | ........................ | 359/819 |
| 6,825,503 | B2 | | 11/2004 | Huang | | |
| 7,095,572 | B2 | | 8/2006 | Lee et al. | | |
| 7,224,542 | B2 | | 5/2007 | Kuchimaru | | |
| 7,312,933 | B2 | * | 12/2007 | Shyu et al. | ..................... | 359/728 |
| 7,332,110 | B2 | | 2/2008 | Inoue et al. | | |
| 7,768,724 | B2 | * | 8/2010 | Tsai et al. | ..................... | 359/819 |
| 2007/0024989 | A1 | | 2/2007 | Kageyama | | |
| 2007/0047109 | A1 | | 3/2007 | Shibata et al. | | |

FOREIGN PATENT DOCUMENTS

| JP | 62251113 | 10/1987 |
| JP | 06258562 | 9/1994 |
| JP | 07120610 | 5/1995 |
| JP | 2003060177 | 2/2003 |
| JP | 3791615 | 4/2006 |
| TW | 0528279 | 4/2003 |
| TW | M313317 | 6/2007 |

* cited by examiner

Primary Examiner — Mohammed Hasan
(74) Attorney, Agent, or Firm — Muncy, Geissler, Olds & Lowe, PLLC

(57) ABSTRACT

An optical glass lens set and a manufacturing method thereof are disclosed. An optical glass lens is used as an insert that is set into a cavity of a mold. By injection molding of the molded insert or press molding, an optical glass lens set with a lens holder is formed. The optical glass lens set includes at least one optical glass lens and a lens holder for fixing the optical glass lens. The manufacturing method simplifies processes and improves the yield rate. Moreover, the produced optical glass lens set is easily packaged into a camera lens, especially suitable for mini-cameras and camera phones.

14 Claims, 15 Drawing Sheets

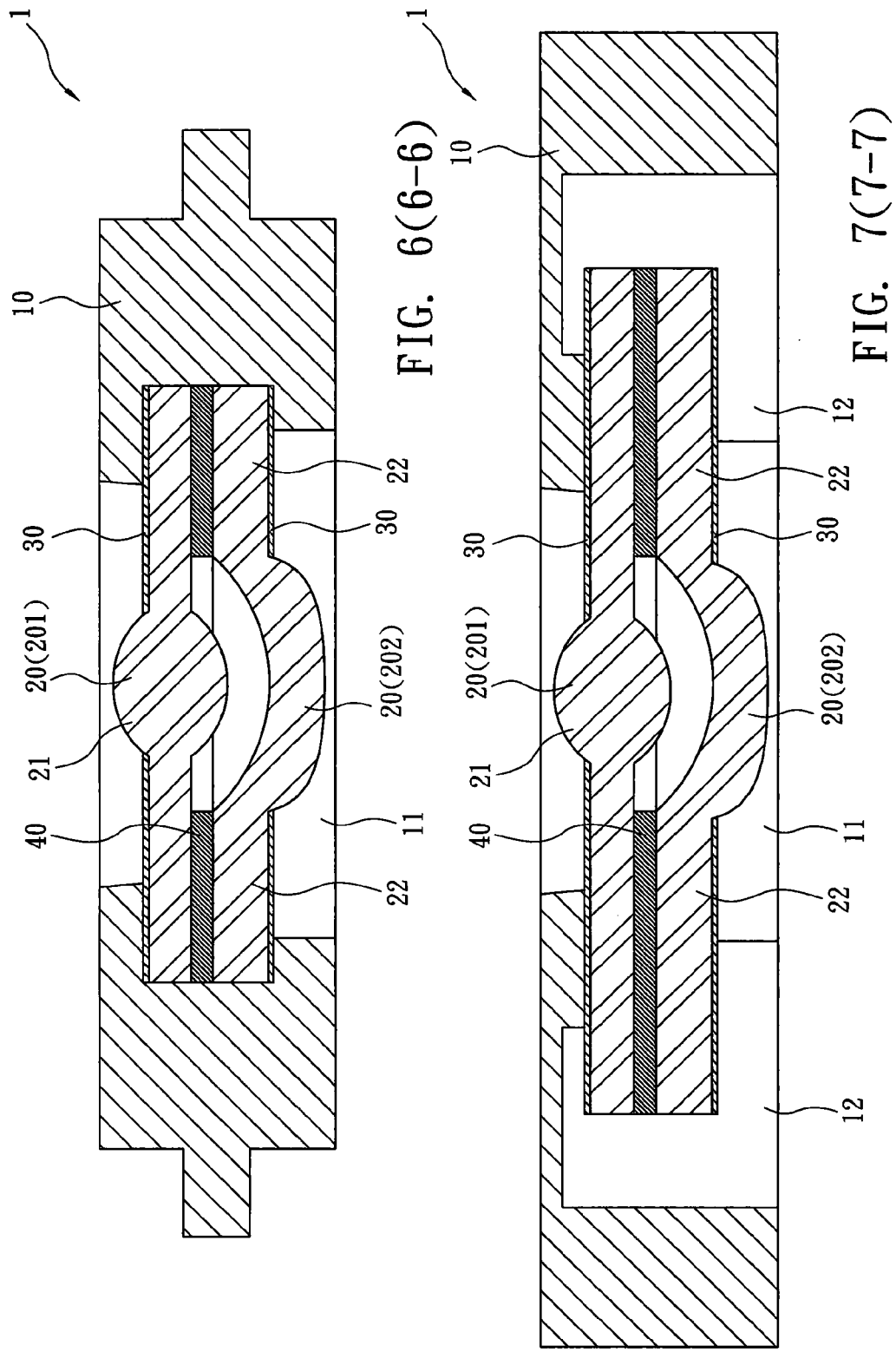

OPTICAL GLASS LENS SET AND MANUFACTURING METHOD THEREOF

BACKGROUND OF THE INVENTION

The present invention relates to an optical glass lens set and a manufacturing method thereof that relate to assembling of an optical glass lens with a lens holder, especially used in small sized lenses of camera or lenses of mobile phones.

The optical lens module is a basic optical element in cameras or camera phones. In practice, the lens module is formed by at least one optical lens. Refer to FIG. 1, an optical lens 20a is made from optical plastic or optical glass and having an optical surface 21a that generally is a round surface, and an outer periphery 22a around the optical surface 21a that can be round or rectangular. In order to fasten and package the optical lens 20a inside a lens module, firstly locate and fasten the lens 20a in a lens holder 10a to form an optical lens set 1a while the lens holder 10a is made from metal or plastic. Thus the lens 20a is aligned with a central axis (optical axis) of the lens module. Moreover, by an actuator, the lens holder 10a (or the optical lens set 1a) moves inside the lens module so as to achieve zoom in/zoom out, as shown in U.S. Pat. Nos. 7,312,933, 7,095,572 US2007/0024989 and JP3650594. A conventional way of fastening the plastic or glass lens 20a in the lens holder 10a is a shown in FIG. 1, especially suitable for glass lens. At first, design a lens holder 10a according to shape of the outer periphery 22a of the lens 20a such as round or rectangular shape. Then the lens 20a is set into a preset hole for being located. Next use UV glue to fasten the lens 20a, throughout a curing process such as passing a UV curing oven for curing. Due to compact size of the lens 20a, the optical surface 21a is easy to get scratched or attach with the glue (flow) when the lens 20a is located and fastened by automatic or manual gluing, such as Japan patent JP3791615, JP06258562 and U.S. Pat. No. 7,224,542, US2007/0047109. The curing process of the UV curing glue between the glass lens 20a and the plastic lens holder 10a is especially long curing time, difficult operation and lower yield rate. Thus the cost is unable to be reduced.

Recently, a technique that places an insert in a mold cavity and then treated with injection molding is called an insert injection molding method. An insert (metal part) is set into a mold cavity of a preset mold. Then inject melt plastic (or rubber) to fill a preset molding area (material pouring area) and cover whole or part of the insert. After cooling and curing, the product is released from the mold. Such manufacturing method is applied broadly to electric elements, connector, mechanical parts and LED, as disclosed in U.S. Pat. No. 5,923,805, TWM313317, and JP07120610 etc.

While manufacturing a cover with plastic lens by such method, the cover (a housing) is used as an insert and put into a mold cavity. Then a plastic lens is made by plastic injection and is integrated with the cover. Or use the plastic lens as an insert and the cover is made by plastic injection and integrated with the plastic lens so as to form an integrated cover with plastic lens, as shown in TW 0528279 and U.S. Pat. No. 6,825,503. Refer to JP62251113, the window glass plate is used as an insert and is covered by plastic material so as to form a window glass or other parts. Refer to U.S. Pat. No. 6,710,945, by two injection holes for plastic material, a molded lens and a lens holder are molded by injection sequentially. Or use infrared gas as the insert and produce a mount covering the glass by injection molding. Refer to U.S. Pat. No. 7,332,110, in a press molding, the eyeglass frame is used as an insert and is placed into a mold cavity. The preform of the plastic lens is heated to a melt status and then the soft preform is turned into the shape of the cavity by heating and pressing of the mold Thus the preform becomes a lens and integrated with the eyeglass frame to form an eyeglass. However, the press molding technique is unable to be applied to a manufacturing process that integrated the glass lens with the plastic lens holder. Once the plastic lens holder is used as an insert, the softening point of the optical glass is about 500° C. that is far higher than the deformation temperature −80° C. of the plastic lens holder. Thus when the temperature of the mold achieves the softening point of the optical glass, the plastic lens holder has already deformed and unable to be molded. Therefore, the press molding is unable to be applied to mass production of the product that uses a plastic lens holder as an insert and glass as molding material.

Due to requirement of high precision of the optical glass lens set for cameras, the location precision between the glass lens and the lens holder has great effects on imaging of the lens. In order to solve poor yield rate and complicated manufacturing processes caused by glue, there is a need to develop a new technique applied to assembling of the optical glass lens with the lens holder during mass production processes of the high precision optical glass lens set.

SUMMARY OF THE INVENTION

Therefore it is a primary object of the present invention to provide an optical glass lens set and a manufacturing method thereof that use an optical glass lens as a molded insert that is put into a cavity of a mold and located by a positioning device. Then produce a lens holder by plastic injection molding or plastic press molding and the lens holder is closely covered on the outer periphery of the optical glass lens so as to form an optical glass lens set with an integrated lens holder. Thus the processes are simplified, the yield rate is increased and the cost is reduced. Moreover, the produced lens set is packaged in the camera lens more easily, especially suitable for mini-sized lens and camera phones.

It is another object of the present invention to provide an optical glass lens set and a manufacturing method thereof that use an opening ring whose shape corresponds to the optical glass lens, attaches and covers on the outer periphery of the lens. The opening ring is made from non-transparent material, being set into a cavity of a mold and located by a positioning device together with the optical glass lens. Thus a lens holder produced by injection/ press molding tightly covers the opening ring on the outer periphery of the optical glass lens so as to form an integrated lens set having the lens holder and the opening ring. The opening ring covers a hole caused by location of the lens holder so that the lens holder has good shielding effects and the imaging efficiency will not be affected by the light leaking from the hole, said, avoiding ghost imaging.

It is a further object of the present invention to provide an optical glass lens set and a manufacturing method thereof that are applied to at least two optical glass lenses. A separator is disposed between the two optical glass lenses so as to fasten the distance there between. The separator, together with the optical glass lens, is put into a cavity of a mold and is located by a positioning device so that the molded lens holder firmly covers on the optical glass lens. Thus the produced optical glass lens set includes a lens holder and at least two optical glass lenses with fixed optical distance there between, so as to maintain stable imaging quality of the optical glass lens.

BRIEF DESCRIPTION OF THE DRAWINGS

FIG. 6 is a cross sectional view along line 6-6 of the embodiment in FIG. 4;

FIG. 7 is a cross sectional view along line 7-7 of the embodiment in FIG. 4;

DETAILED DESCRIPTION OF THE PREFERRED EMBODIMENT

Figure 1:
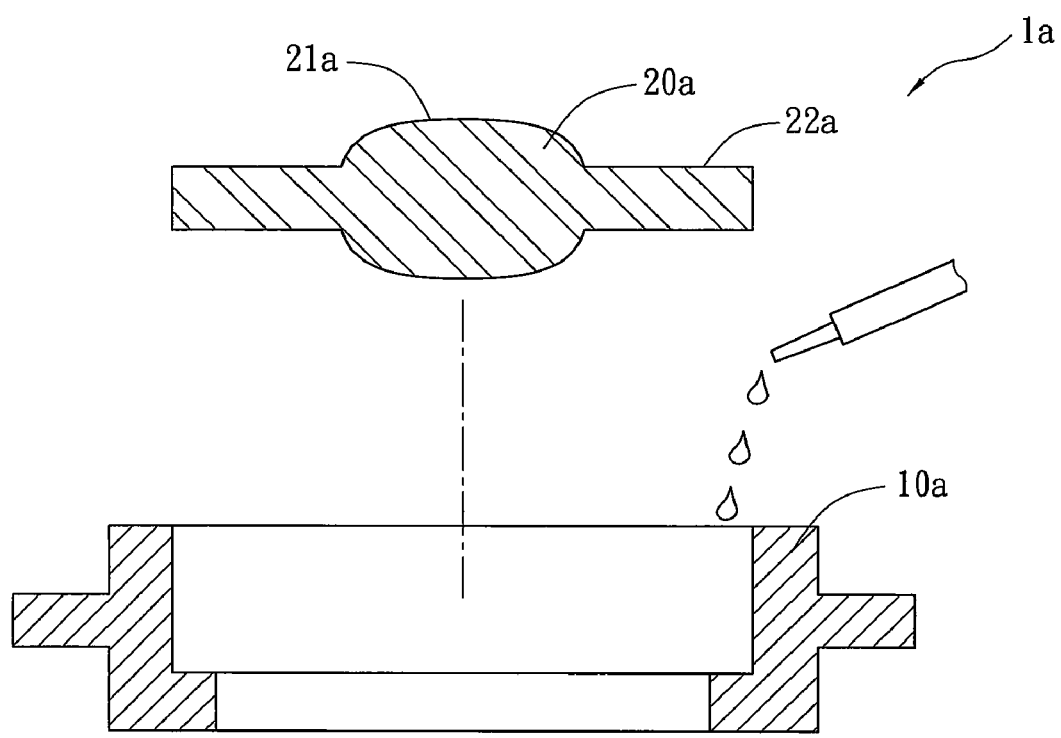
FIG. 1 is a schematic drawing of a prior art.

Refer to FIG. 2 to FIG. 8, the optical glass lens set 1 of this invention consists mainly of at least an optical glass lens 20 and a lens holder 10 for fixing the lens 20. The lens 20 is made by optical glass, having an optical surface 21 (corresponding to the optical surface 21a as shown in FIG. 1) and an outer periphery 22 (corresponding to the outer periphery 22a as shown in FIG. 1) surrounding the optical surface 21 without optical function. There is no restriction on shape of the optical surface 21 and the outer periphery 22.

The lens 20 of this invention is further disposed with an opening rings 30 to avoid or prevent light leakage of the imaging light or avoid or prevent the light such as the LED set in camera from going through holes on the lens holder 10 into the optical lens 20. The opening ring 30 is made from non-transparent material such as black plastic material. It is alternative to use one or two opening ring 30 respectively to attach and cover on one side or both two sides of the outer periphery 22 of the lens 20 according to the design requirement of the optical glass lens set 1. The lens 20 and the opening ring 30 are used as the molded insert that are put into a cavity of a mold and located, and then produce a lens holder 10 by plastic injection molding or plastic press molding and the lens holder 10 is closely covered on the molded inserts to form an optical glass lens set 1. There is no restriction on shape, dimensions such as thickness or width (outer diameter) of the opening ring 30 depending on the design requirement of the optical glass lens set 1. The shape and/or dimensions of the opening ring 30 can be changed depending on the assembling requirement of the lens with the optical glass lens set 1.

The lens 20 of the optical glass lens set 1 may consists of two or a plurality of lens pieces such as the lens of camera or imaging lens, and the shape of each lens piece of the optical glass lens 20 commonly includes biconvex, biconcave, meniscus etc. Furthermore, a space for keeping a certain distance between the tow or a plurality of lens pieces is arranged to achieve the optical imaging effect. Refer to FIG. 6 and FIG. 7, setting a separator 40 between the tow lens pieces or increasing the thickness of the outer periphery 22 (not shown in FIG. 6 and FIG. 7) is to corresponding to certain optical distance between the two lens pieces of the optical glass lens 20. Thus, the lens 20, the separator 40 and the opening ring 30 being as the molded insert are put into a cavity of a mold and located, and then produce a lens holder 10 by plastic injection molding or plastic press molding and the lens holder 10 is closely covered on the molded inserts to form an optical glass lens set 1.

Figure 8:
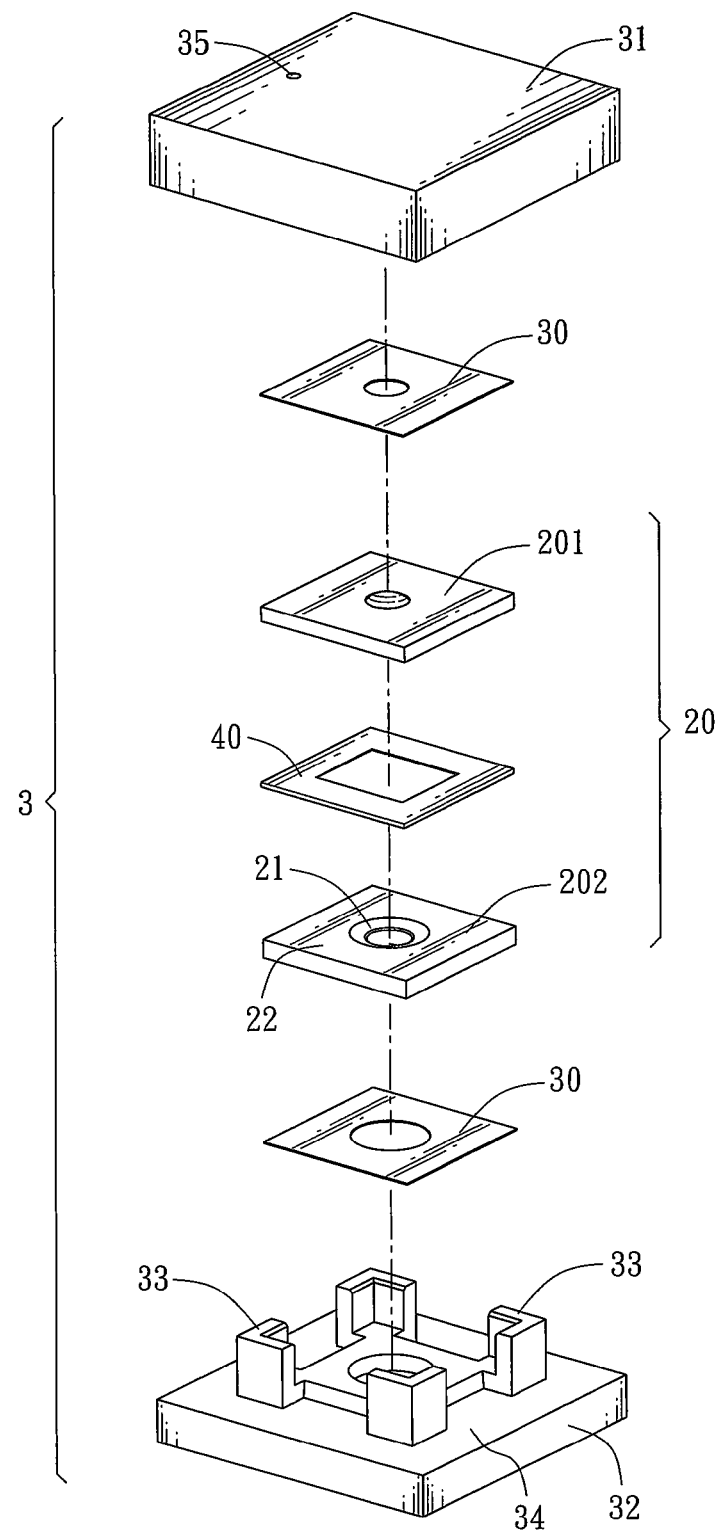
FIG. 8 is an explosive view of another embodiment according to the present invention.
Figure 10:
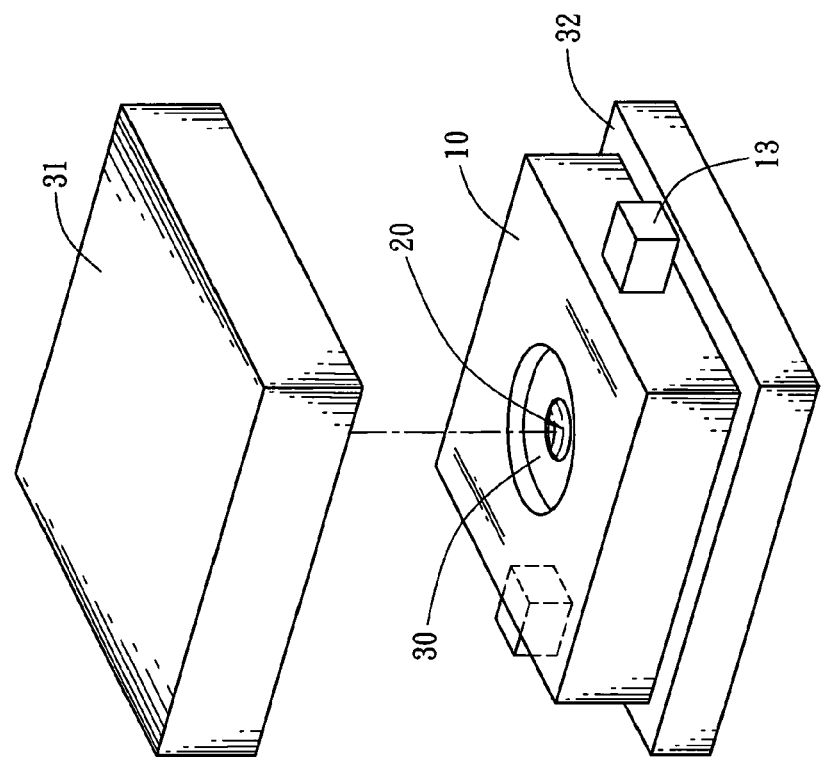
FIG. 10 shows an opened mold after forming of the embodiment in FIG. 9.
Figure 9:
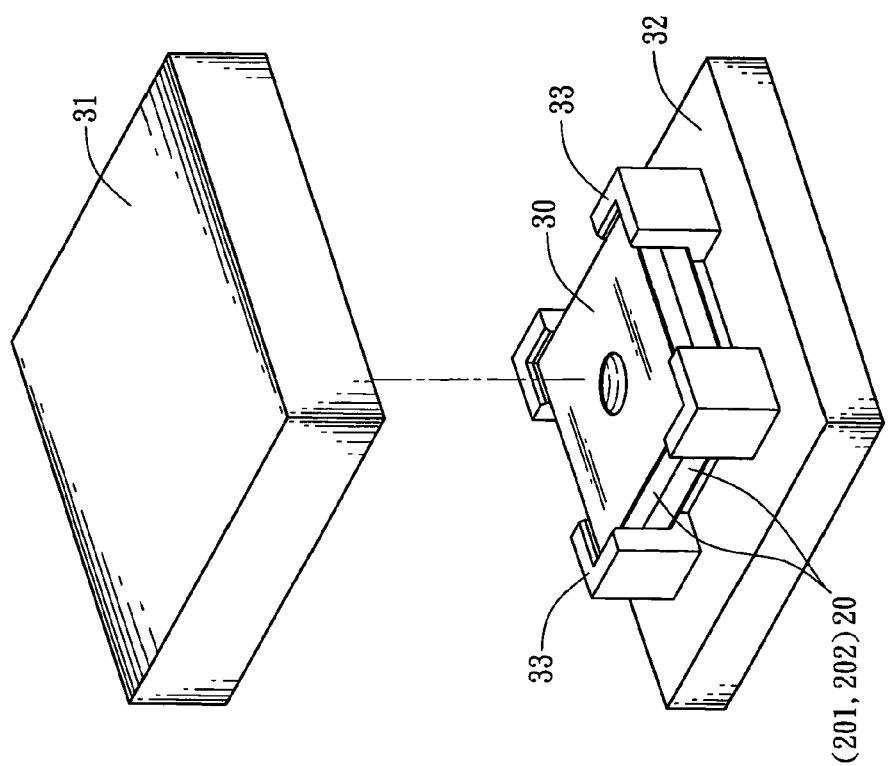
FIG. 9 is a schematic drawing showing inserts put into a cavity of the embodiment in FIG. 8.
Figure 11:
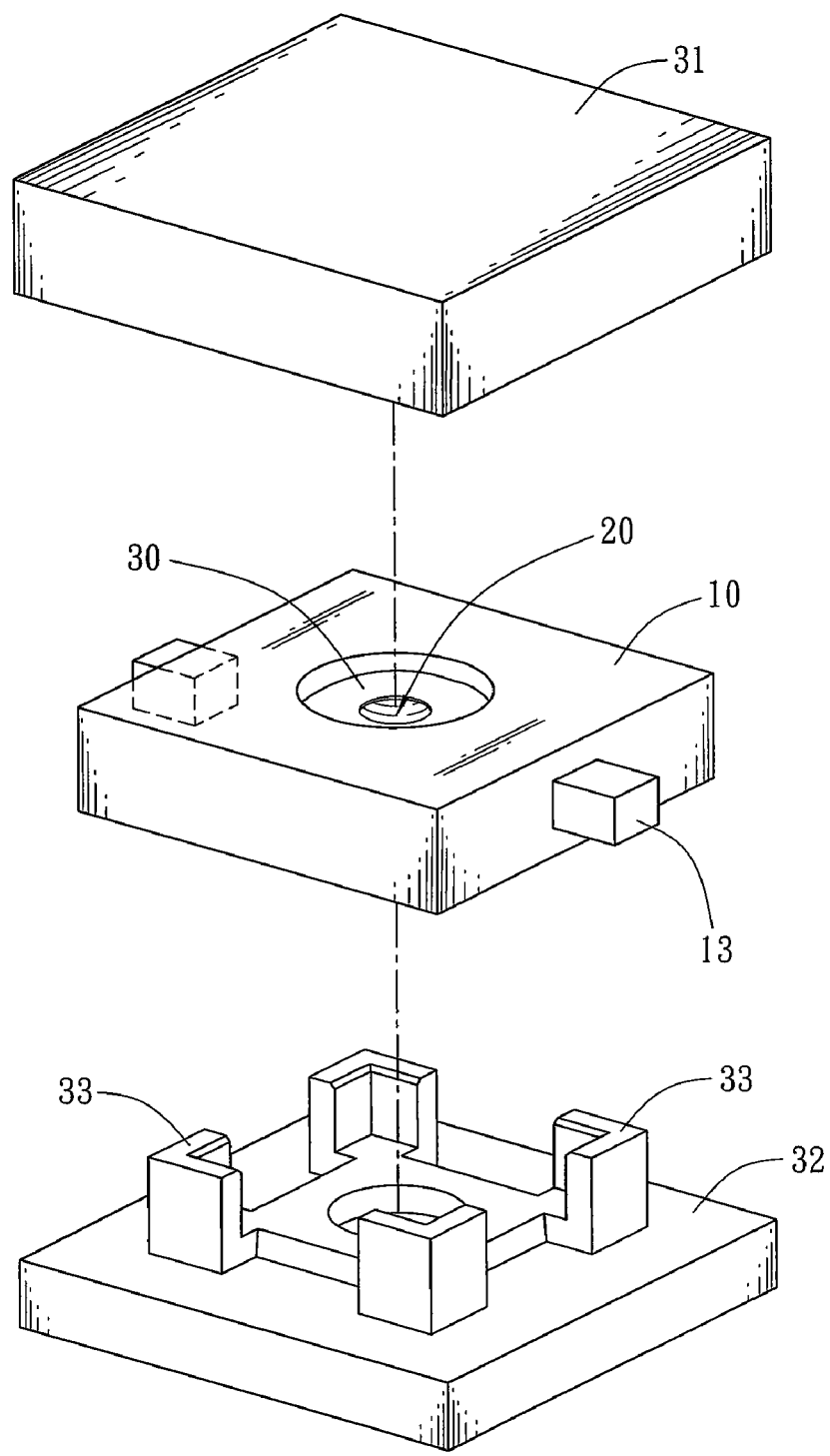
FIG. 11 is a schematic drawing showing releasing of the lens of the embodiment in FIG. 10.

The optical glass lens set 1 of this invention may be produced by plastic injection molding as shown in FIG. 8, and having the following steps:

(1) provide at least one optical glass lens 20 having the optical surface 21 and the outer periphery 22; in FIG. 8, the optical glass lens 20 includes two pieces of optical glass lens 201, 202;

(2) provide an injection mold 3 of the lens 20; the injection mold 3 consists of an upper mold 31 and a lower mold 32, and a preset forming area 34 of a lens holder—a pouring area 34 for forming the lens holder 10 in the mold 3 is defined while a pouring slot 35 is arranged on the mold 3;

(3) put and locate the lens 20 (201, 202), the separator 40 and the opening ring 30 in sequence as the molded inserts into the cavity defined by the upper mold 31 and the lower mold 32 of the mold 3;

(4) pour the plastic material 50 heated to a certain temperature through the pouring slot 35 and then the plastic 50 flows into and fills the material pouring area 34;

(5) after the plastic material 50 being cooled and hardened, separate the upper mold 31 and the lower mold 32 of the mold 3, and then release the finished optical glass lens set 1 lens set 1.

Figure 18:
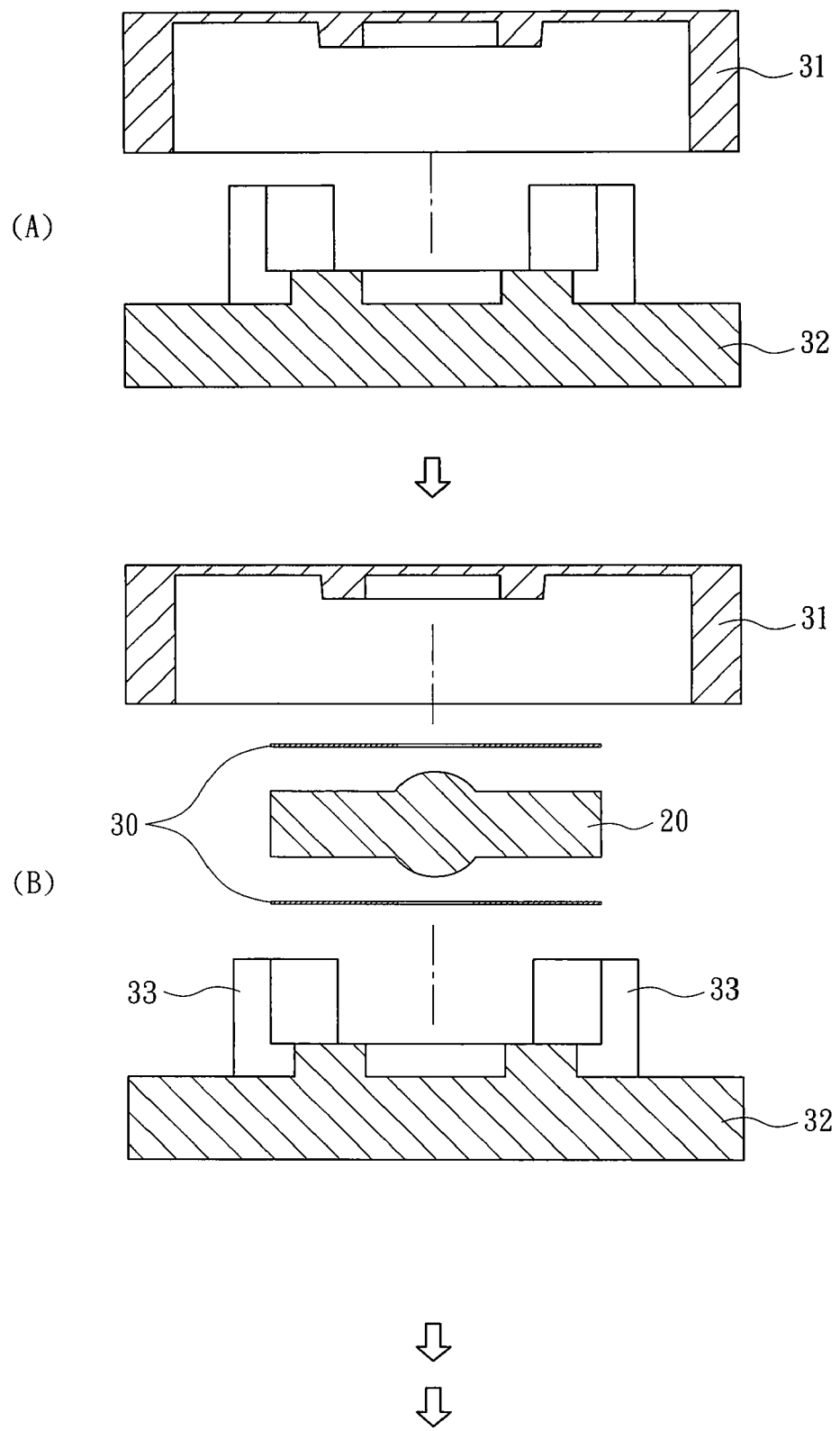
FIG. 18(A) to FIG. 18(E) show manufacturing processes of a further embodiment according to the present invention.
Figure 18:
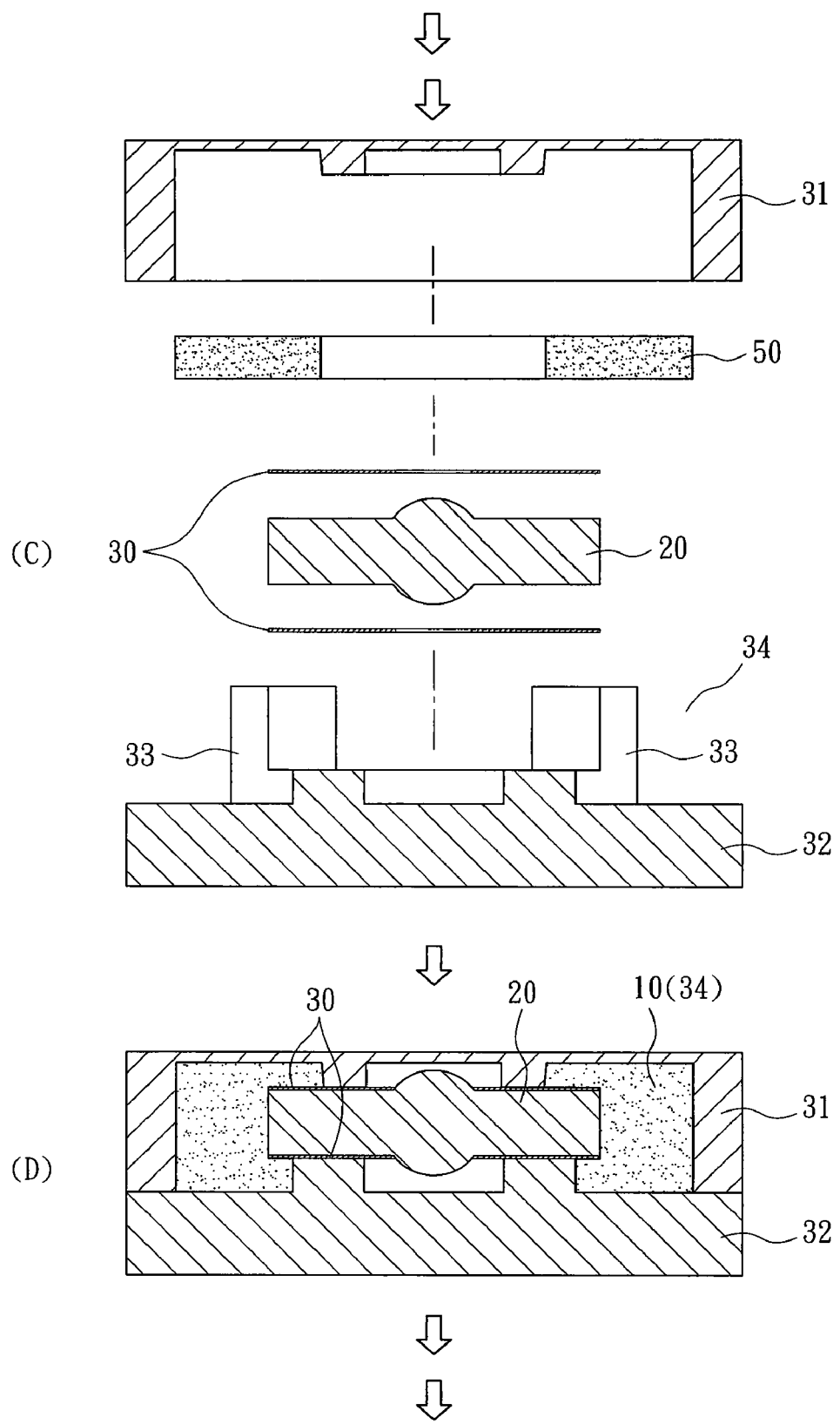
Figure 18:
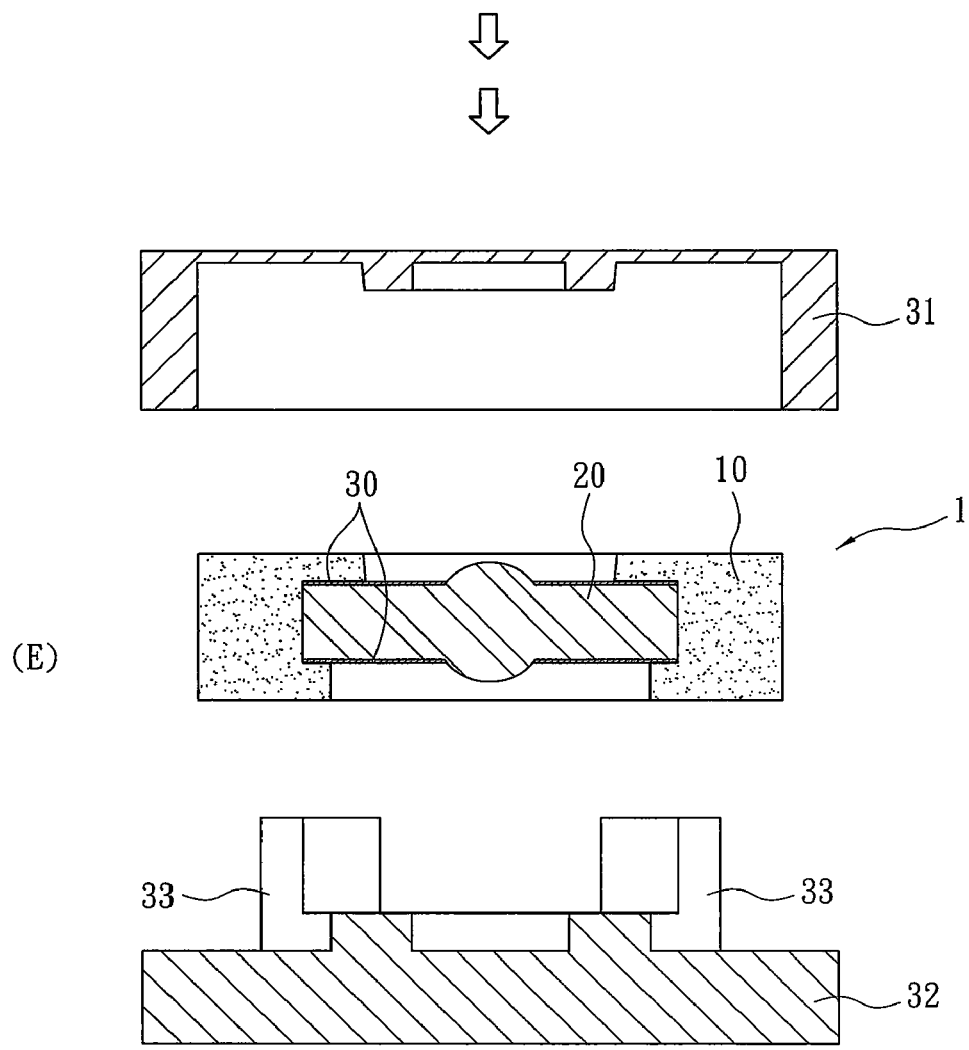

Furthermore, the optical glass lens set 1 of this invention may be produced by plastic press molding as shown in FIG. 18, and having the following steps:

(1) provide an optical glass lens 20 having at least one optical surface 21 and an outer periphery 22; in FIG. 18, the optical glass lens 20 includes two pieces of optical glass lens 201, 202;

(2) provide a press molding mold 3 for press molding of the lens 20; the press molding mold 3 consists of an upper mold 31 and a lower mold 32; and a preset forming area 34 for forming the lens holder 10 in the mold 3 is defined;

(3) use the lens 20 (201, 202), the separator 40 and the opening ring 30 as the molded inserts, put and localize them sequentially into the cavity defined by the upper mold 31 and the lower mold 32 of the mold 3;

(4) a plastic preform made of a certain amount of plastic material 50 is put into the cavity defined by the upper mold 31 and the lower mold 32 of the mold 3;

(5) close and heat the upper mold and the lower mold 31, 32 to make the plastic perform softened at a certain temperature; then increase pressure on the upper mold 31 and the lower mold 32 to make the softened plastic material flow into the preset forming area 34 of the lens holder 10 defined by the upper mold 31 and the lower mold 32 of the mold 3, and pressed by a shape of a cavity of the upper mold 31 as well as the lower mold 32.

(6) after forming and molding of the plastic material, reduce pressure and temperature of the mold 3; after the plastic material 50 being cooled and hardened, separate the upper mold and the lower mold 31, 32 to release the finished lens set 1.

The forming mold 3 applied for manufacturing the optical glass lens set 1 consists of the positioning device 33 for making the lens 20 positioned accurately in the mold 3, optical axis of the optical surface 21 of the lens 20 align with the optical axis of the integrated lens set 1; There is no restriction on locating position and positioning type of the positioning device 33. There is no restriction on shape of the optical glass lens 20 such as a rectangular optical glass lens 20 or a circular optical glass lens 20. There is no restriction on shape of the cavity (the preset forming area 34), so as to form a rectangular lens holder 10 (i.e. an rectangular optical glass lens set 1) or a circular lens holder 10 (i.e. an circular optical glass lens set 1) depending on the design requirement of the optical glass lens set 1.

The preferred embodiments are described respectively as follows:

The First Embodiment

Figure 2:
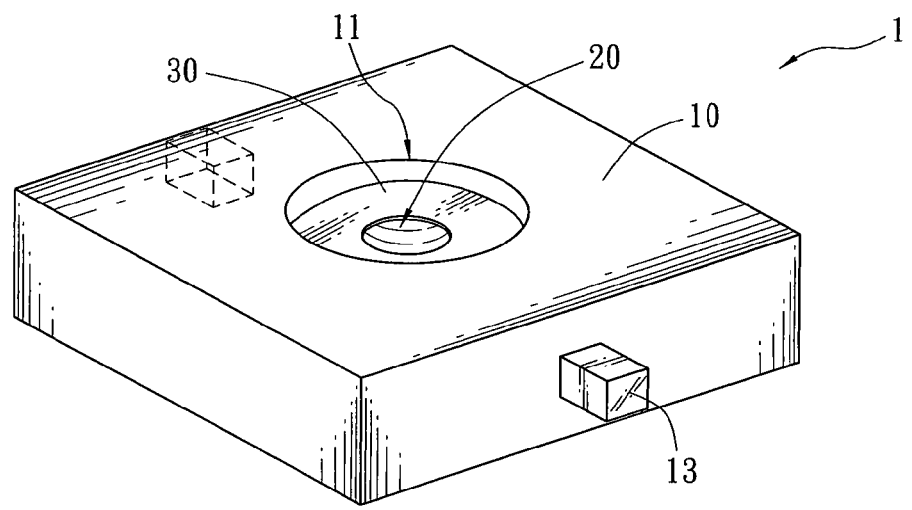
FIG. 2 is a frontal perspective view of an embodiment of a lens set according to the present invention.
Figure 3:
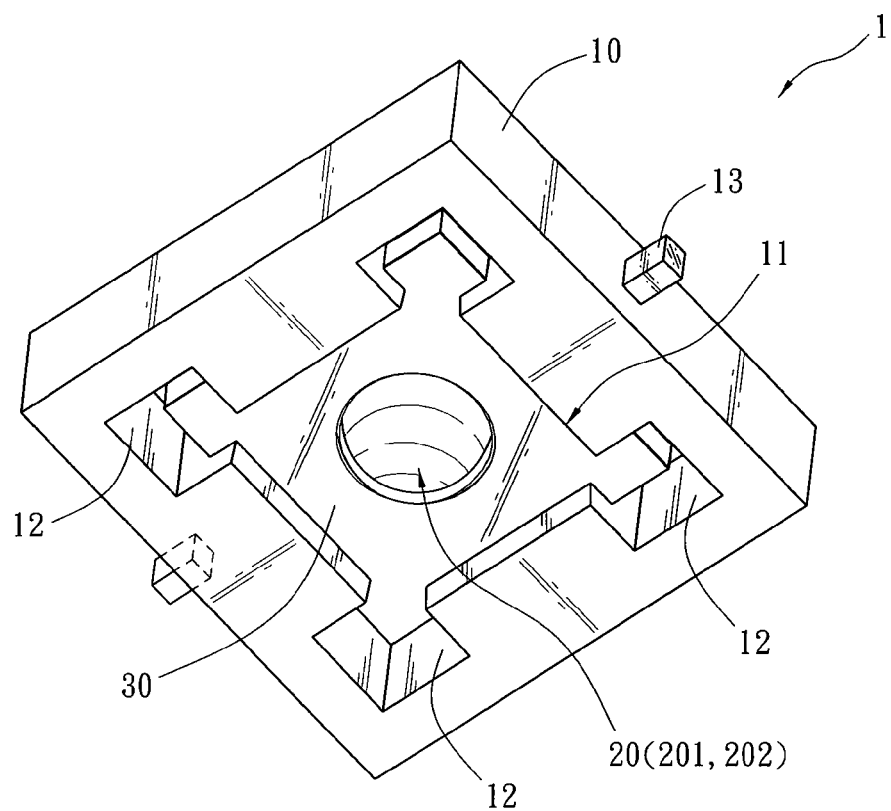
FIG. 3 is a basal perspective view of an embodiment in FIG. 2.

This embodiment discloses an optical glass lens set with a single optical glass lens and a manufacturing method thereof. Refer to FIG. 2 & FIG. 3, the optical glass lens set 1 consists of an optical glass lens 20 and a lens holder 10 for fixing the lens 20. The lens 20 is made by optical glass, having an optical surface 21 and an outer periphery 22 surrounding the optical surface 21 without optical function. There is no restriction on shape of the optical surface 21 and the outer periphery 22. In this embodiment, the lens 20 is made by precision glass molding, the outer periphery 22 is rectangular, and the optical surface 21 is bi-convex. The lens holder 10 is made by injection molding and is formed on an outer surface of the outer periphery 22 of the lens 20, tightly covering thereon. An opening 11 for imaging light to pass through is formed on a center area of the lens holder 10. Thus an integrated lens set 1 with a lens holder 10 is produced. The lens holder 10 is rectangular and is disposed with a guiding rail 13 that allows the lens set 1 to move along an optical axis while the lens set 1 being assembled in a lens module.

Figure 4:
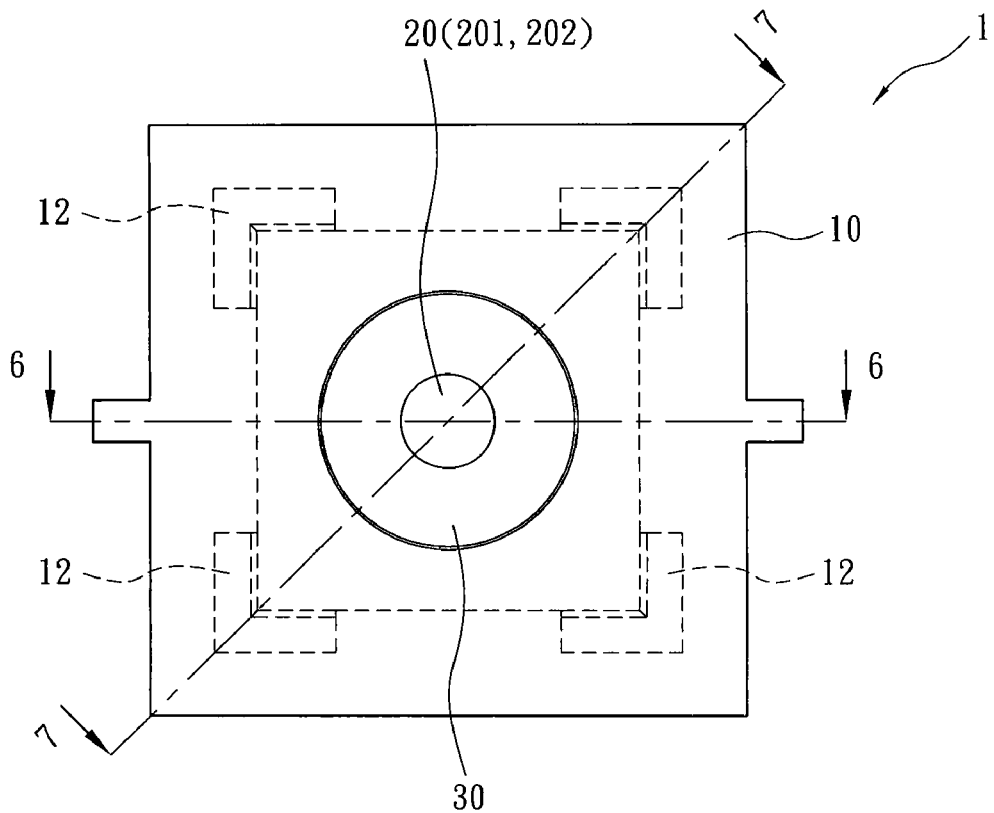
FIG. 4 is a top view of the embodiment in FIG. 2.
Figure 5:
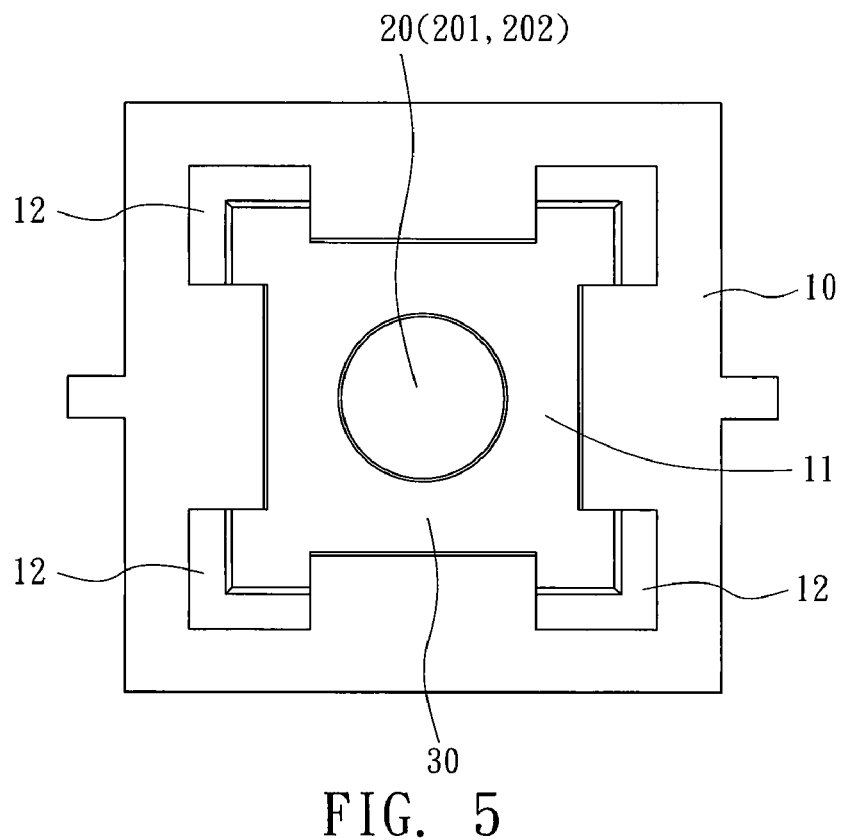
FIG. 5 is a bottom view of the embodiment in FIG. 2.

The lens set 1 is further disposed with two opening rings 30 whose shape correspond to the shape of the lens 20. The opening ring 30 is made by opaque black plastic material and is attached on two sides of the outer periphery 22 of the lens 20 for completely covering, as shown in FIG. 4 & FIG. 5. Before injection molding of the lens holder 10, the opening ring 30 is attached so that part of the lens holder 10 firmly covers the opening ring 30 for providing an integrated lens 1. The function of the opening ring 30 is to avoid or prevent light leakage of the imaging light through holes on the lens holder 10 such as insertion holes 12 on FIG. 3 & FIG. 4. The insertion hole 12 is formed because that the positioning device 33 (in FIG. 8) is disposed in the mold for localization of the lens 20. Thus correspondingly insertion holes 12 are formed on the lens holder 10. Moreover, the shade area of the opening ring 30 can further cover the whole outer periphery 22. That means only the optical surface 21 exposes outside, as shown from FIG. 2 to FIG. 7. Thus the lens 20 has light-focusing and aperture stop effects.

Figure 12:
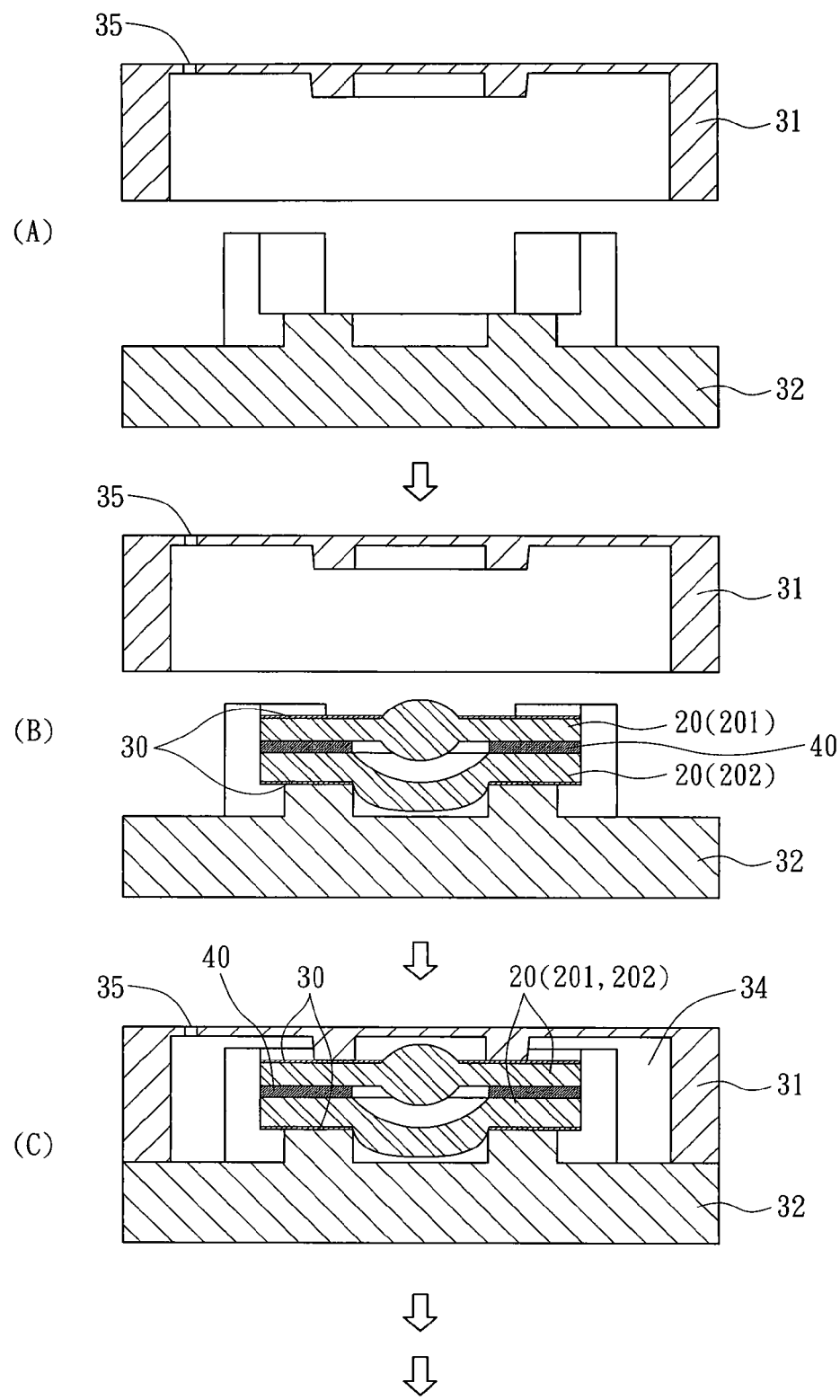
FIG. 12(A) to FIG. 12(E) show manufacturing processes of another embodiment according to the present invention.
Figure 12:
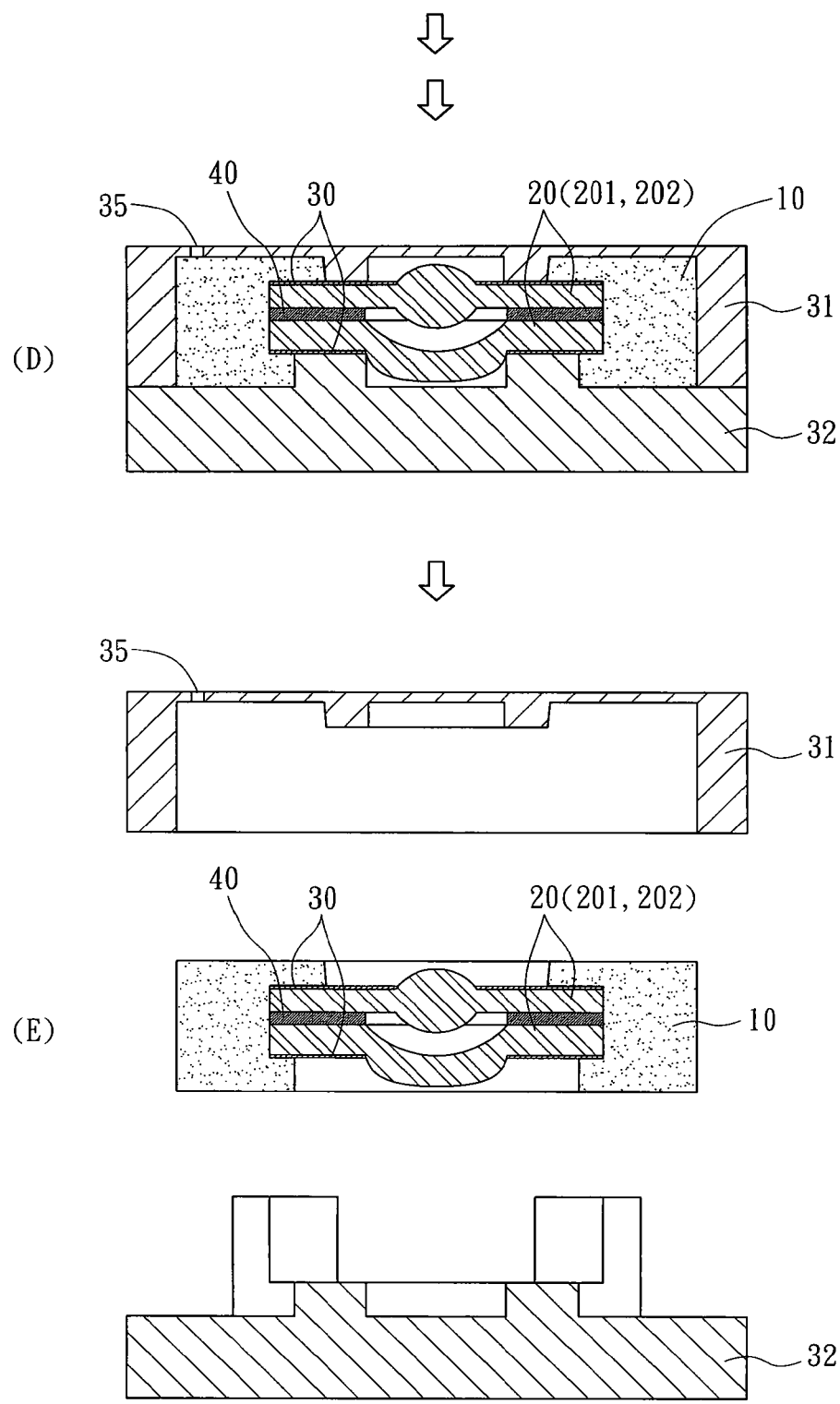

Refer from FIG. 8 to FIG. 12, a manufacturing method of the lens set 1 in this embodiment is the same as that of the second embodiment—a lens set with two pieces of optical glass and having following steps:

firstly, provide at least one optical glass lens 20 having the optical surface 21 and the outer periphery 22. Example is shown in the FIG. 8, the optical glass lens 20 includes two pieces of optical glass lens 201, 202;

provide an injection mold 3 of the lens 20; the injection mold 3 consists of an upper mold 31 and a lower mold 32, as shown in FIG. 12(A);

put and located the lens 20, an upper opening ring 30 and a lower opening ring 30 as inserts into the mold 3 in sequence as shown in FIG. 12(B). The positioning device 33 is used to make the optical axis of the optical surface 21 of the lens 20 align with the optical axis of the integrated lens set 1;

then close the upper mold 31 with the lower mold 32, as shown in FIG. 12 (C); after that, a preset forming area 34 of a lens holder—a pouring area 34 for forming the lens holder 10 in the mold 3 is defined while a pouring slot 35 is arranged on the mold 3. As to the shape of the area 34 (shape of the lens holder 10), position or number of the pouring slot 35 are designed according to the injection mold technique. In this embodiment, the number of the pouring slot 35 is one;

pour the plastic material 50 heated to a certain temperature with certain viscosity through the pouring slot 35 and then the plastic 50 flows into and fills the material pouring area 34, as shown in FIG. 12(D). In this embodiment, the plastic material 50 is thermoplastic LCP (liquid crystal polymer) resin. The injection molding is performed when the LCP resin is heated to 300° C. and the mold 3 is heated to 50° C.;

after the plastic material 50 being cooled and hardened, release the final product and the integrated lens set 1 is obtained, as shown in FIG. 12 (E).

The Second Embodiment

Refer to FIG. 4 & FIG. 5, a two-piece type optical glass lens set is disclosed. The lens set 1 consists of two pieces of lenses 20—a bi-convex optical glass lens 201 and a meniscus optical glass lens 202, a separator 40 for keeping a certain distance between the tow pieces of lenses 201, 202 so as to form an image, and a lens holder 10 for fixing the two pieces of lenses 201, 202. The lense 20 is made of optical glass and an outer periphery 22 is rectangular. The way of manufacturing of this embodiment is the same with that of the above embodiment-glass precision molding. The separator 40 is arranged between the two pieces of lenses 201, 202 and its thickness means the certain distance between the two pieces of lenses 201, 202. The opening ring 30 is attached on the outer periphery 22 on two sides of the lenses 20 and is made of opaque material such as plastic or aluminum foil. The lens holder is produced by injection molding. A opening ring 30, a lens 201, a separator 40, a lens 202 and another opening ring 30 are used as inserts. After injection molding, the lens holder 10 covers on the outer periphery 22 of the two pieces of optical glass lenses 20 so as to form an integrated lens set 1 with the lens holder 10.

Refer from FIG. 8 to FIG. 12, a manufacturing method of the lens set 1 in this embodiment includes the following steps:

provide a opening ring 30, a lens 201, a separator 40, a lens 202 used as molded inserts and a mold 3 for injection molding, as shown in FIG. 12(A);

put the inserts into the mold 3 in sequence and locate them by a positioning device 33 on a lower mold 32, as shown in FIG. 12(B);

then close the upper mold 31 with the lower mold 32 and draw air by a vacuum pump so as to prevent residual air on a preset forming area 34 that has negative effects on injection molding;

pour the plastic material 50 heated to a certain temperature with certain viscosity through the pouring slot 35 and then the plastic 50 flows into and fills the preset forming area 34 of the lens holder 10, as shown in FIG. 12(D); in this embodiment, the plastic material 50 is thermoplastic LCP resin. The injection molding is performed when the LCP resin is heated to 300° C. and the mold 3 is heated to 50° C.;

after the plastic material 50 being cooled and solidified, release the final product and the integrated optical glass lens set 1 is obtained, as shown in FIG. 12 (E).

The Third Embodiment

Figure 13:
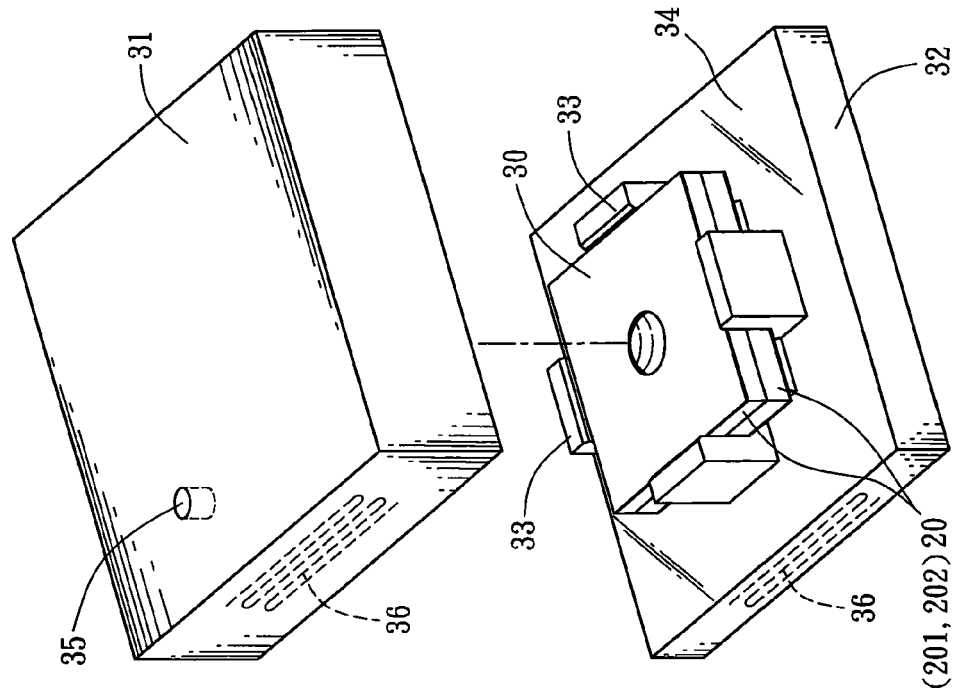
FIG. 13 shows a mold of a further embodiment according to the present invention.
Figure 14:
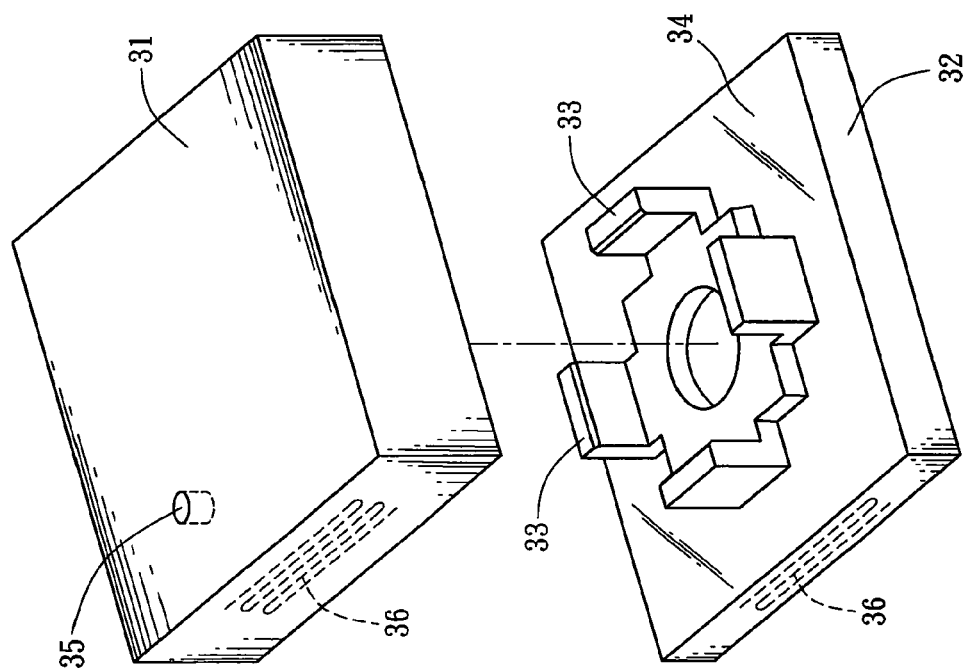
FIG. 14 is a schematic drawing showing inserts set into a cavity of the embodiment in FIG. 13.
Figure 15:
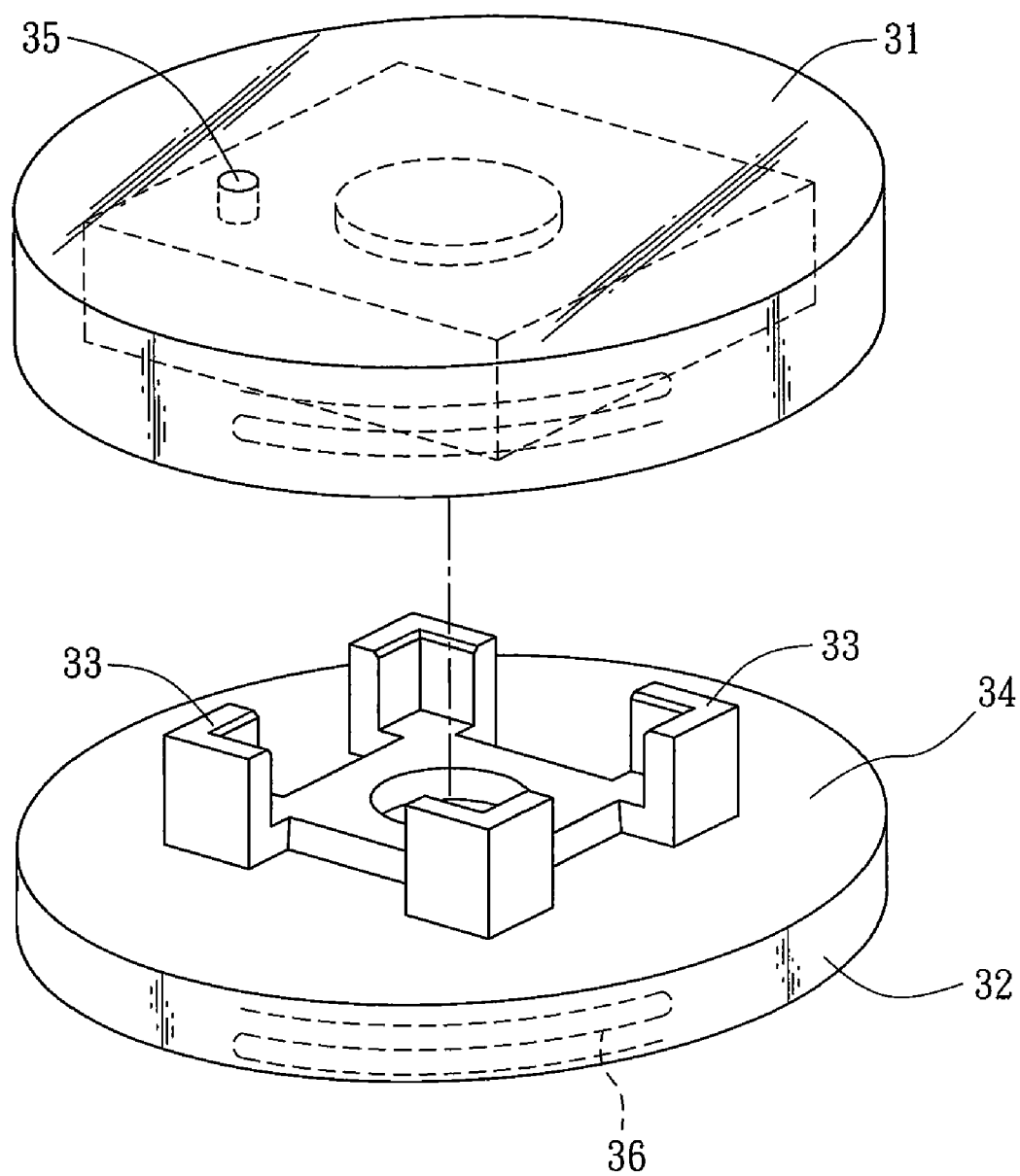
FIG. 15 shows another mold of a further embodiment according to the present invention.

A rectangular lens set 1 of this embodiment includes at least one rectangular optical glass lens 20, as shown in FIG. 2 & FIG. 3. Refer from FIG. 13, FIG. 14 & FIG. 15, a mold for injection molding 3 of the rectangular lens set 1 consists of an upper mold 31, a lower mold 32, a pouring slot 35, a positioning device 33 and a heater wire 36. The positioning device 33 is formed by four localization points having two sets of pairs of localization points. The rectangular lens 20 is arranged on a center of the two sets of localization points. Through molding flow design of the pouring slot 35, its location and size of the pore enable liquid plastic at temperature of 300 degrees Celsius to flow and fill the preset forming area 34 of the lens holder in a certain period. The heater wire 36 connects to a temperature controller of a plastic injection molding equipment for control of temperature of the upper mold 31 and the lower mold 32.

The manufacturing method of the rectangular lens set in this embodiment is the same with that of the second embodiment. When the plastic material (LCP resin) is heated to 300° C. and the mold is heated to 50° C., the injection molding process is run.

The Fourth Embodiment

Figure 17:
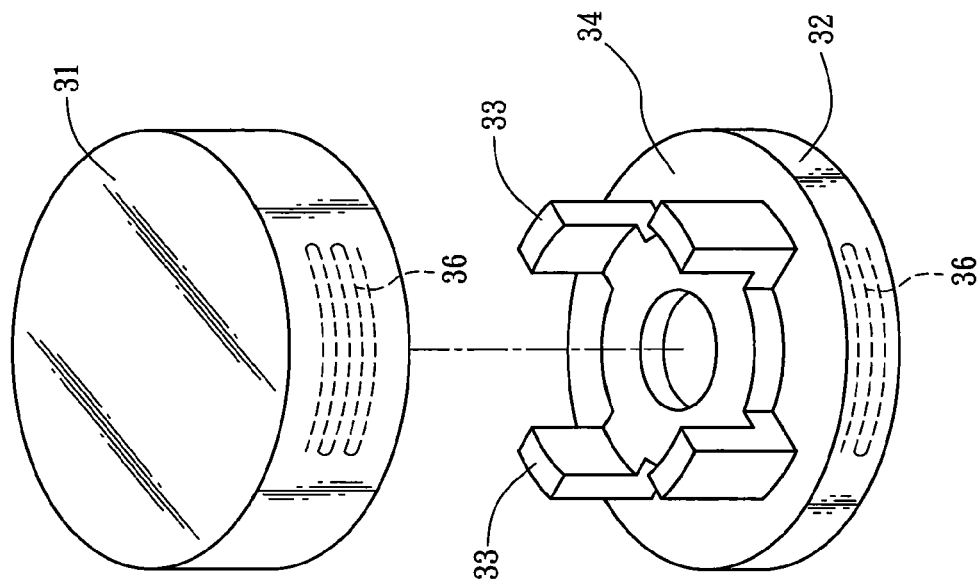
FIG. 17 shows another mold of a further embodiment according to the present invention.
Figure 16:
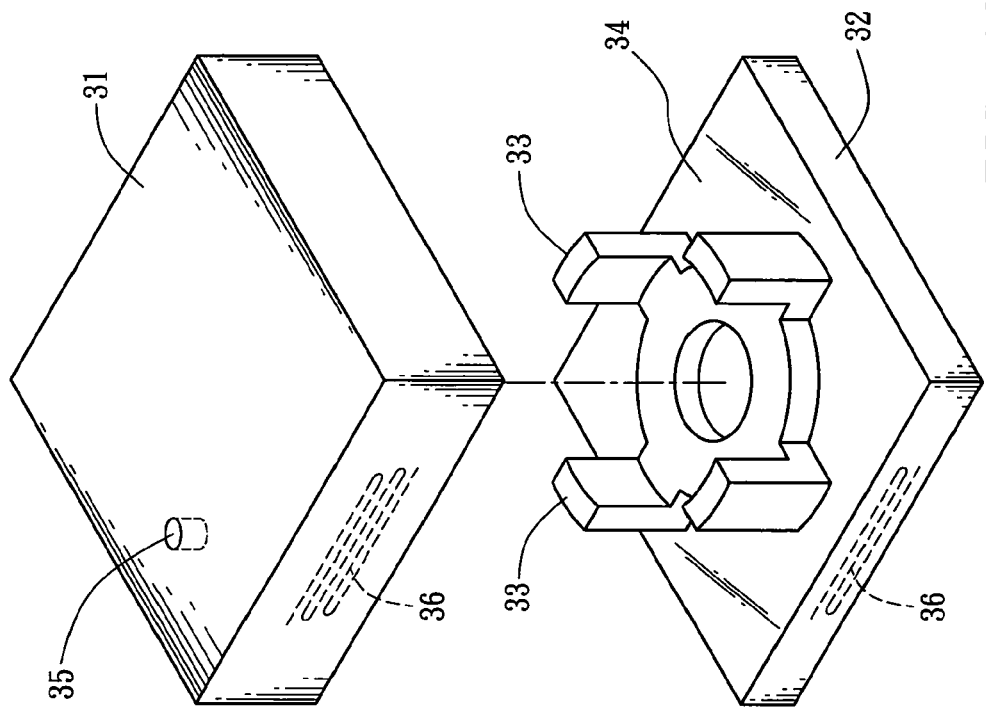
FIG. 16 shows a mold of a further embodiment according to the present invention.

An optical glass lens set 1 with a single-piece of optical glass lens 20 in this embodiment is produced by press molding. Refer to FIG. 2 & FIG. 3, the lens set 1 includes a lens 20 and a lens holder 10. The main structure is the same with the first embodiment and the lens holder 10 is formed around an outer periphery 22 of the optical glass lens 20 by press molding and this is different from the first embodiment made by injection molding. Refer to FIG. 18, a press molding method of the lens set 1 in this embodiment includes the following steps:

provide an optical glass lens 20 having at least one optical surface 21 and an outer periphery 22 and a mold for press molding of the lens 20; the mold 3 includes an upper mold 31 and a lower mold 32, as shown in FIG. 18(A);

use the lens 20, an upper opening ring 30 and a lower opening ring 30 as inserts, put and localize them in the mold 3 sequentially, as shown in FIG. 18(B); the way of localization is shown in FIG. 16 & FIG. 17, the lens 20 and the opening ring 30 are localized by a positioning device 33 on the lower mold 32.;

a plastic preform (50) made of a certain amount of plastic material 50 is put on the above inserts, as shown in FIG. 18(C); the plastic material 50 in this embodiment is thermoplastic LCP resin;

close and heat the upper mold and the lower mold 31, 32; also draw the air by a vacuum pump to prevent residual air on the preset forming area 34 that may have negative effects on press molding; when the mold 3 is heated to 65° C., increase pressure on the upper mold 31 and the lower mold 32 and continue heating the mold 3 to 85° C. Then the pressure of the upper mold 31 and the lower mold 32 achieves preset 200 psi and temperature of the plastic material 50 inside the mold 3 ranges from 120° C. to 150° C. Now the plastic material 50 flows into the preset forming area 34 of the lens holder 10, being pressed by a shape of a cavity of the upper mold 31 as well as the lower mold 32.

After forming and molding of the plastic material 50, reduce pressure and temperature of the upper mold 31 and the lower mold 32; when the pressure is common and the temperature is 50° C.~60° C., separate the upper mold and the lower mold 31, 32 to release the finished lens set 1, as shown in FIG. 18(E).

The Fifth Embodiment

An optical glass lens set 1 with round optical glass lens in this embodiment (not shown in figure) is made by press molding. The forming mold is shown in FIG. 16 & FIG. 17, including an upper mold 31, a lower mold 32, a positioning device 33 and a heater wire 36. The positioning device 33 is formed by four localization points (or three localization points) that locate around the round optical glass lens (20). The heater wire 36 connects to a temperature controller of a plastic injection molding equipment for control of temperature of the upper mold 31 and the lower mold 32.

The manufacturing processes of this embodiment are the same with those of the fourth embodiment. The insert is set into the positioning device 33 and then put the plastic material (50), generally powder or preform, into the preset area of the lens holder 10. Then heat the upper and the lower molds 31, 32 to preset temperature such as 85° C. for performing press molding processes.

The optical glass lens set 1 according to the present invention includes the following advantages:

<1> A manufacturing method of the present invention improves shortcomings of conventional manufacturing methods of optical glass lens set and simplifies manufacturing processes, improves yield rate, reduces the cost and facilitates mass production of the optical glass lens set.

<2> The optical glass lens set 1 of the present invention is packaged in the lens more easily, especially suitable in lens of mini-cameras and lens of mobile phones. Thus mass production of the lens is more feasible.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical glass lens set comprising at least one optical glass lens, at least one opening ring and a lens holder; wherein the optical glass lens is made of optical glass and having at least one optical surface and an outer periphery of a non-optical surface around the optical surface;

the opening ring is attached on the outer periphery of the optical glass lens;

the lens holder is formed around and covering on the outer periphery of the optical glass lens by injection molding while an opening for imaging light to pass through is formed on a center area of the lens holder, corresponding to the optical surface of the optical glass lens;

wherein the optical glass lens set is formed by the steps of:

providing an injection mold for the optical glass lens having a preset forming area of a lens holder; the injection mold is disposed with at least one pouring slot and disposed with a positioning device so as to localize the optical glass lens and the opening ring while being put into the injection mold for aligning an optical axis of the optical surface of the optical glass lens with a central axis of the optical glass lens set;

putting and localizing at least one optical glass lens and an opening ring attached on the outer periphery of non-optical surface of the optical glass lens, used as a molded insert, into the injection mold;

heating plastic material into preset temperature and pouring the plastic material into the preset forming area of the lens holder of the injection mold through the pouring slot; and after the plastic material cooled and hardened, releasing the optical glass lens set from the mold.

2. The optical glass lens set as claimed in claim 1, wherein the optical glass lens is a round glass lens or a rectangular lens.

3. The device as claimed in claim 1, wherein the lens holder is rectangular or round.

4. The optical glass lens set as claimed in claim 1, wherein the lens holder is made of opaque plastic material.

5. The optical glass lens set as claimed in claim 1, wherein area of the opening ring that covers the outer periphery of the optical glass lens further comprising the non-optical surface of the whole outer periphery.

6. The optical glass lens set as claimed in claim 1, wherein the optical glass lens having at least two optical lenses.

7. The optical glass lens set as claimed in claim 6, wherein the optical glass lens set further comprising a separator disposed between the outer periphery of two optical glass lenses so as to form a certain optical distance that is corresponding to thickness of the separator between the optical surfaces of the two optical glass lenses.

8. An optical glass lens set comprising at least one optical glass lens, at least one opening ring and a lens holder; wherein the optical glass lens is made of optical glass and having at least one optical surface and an outer periphery of a non-optical surface around the optical surface;

the opening ring is attached on the outer periphery of the optical glass lens;

the lens holder is formed around and covering on the outer periphery of the optical glass lens by press molding while an opening for imaging light to pass through is formed on a center area of the lens holder, corresponding to the optical surface of the optical glass lens;

wherein the optical glass lens set is formed by the steps of:

providing a mold for press molding of the optical glass lens having a preset forming area of a lens holder and disposed with a positioning device so as to localize the optical glass lens and the opening ring while being put into the injection mold for aligning an optical axis of the optical surface of the optical glass lens with a central axis of the optical glass lens set;

putting and localizing at least one optical glass lens with a opening ring attached on the outer periphery of non-optical surface of the optical glass lens, used as a molded insert, into the mold;

putting plastic material with preset weight into a preset space in the mold;

heating the mold so as to make the plastic material become soft and pressuring the mold so that the soft plastic material flows into the preset forming area of the lens holder;

cooling down and reducing the pressure on the mold until the plastic material cooled to preset temperature and hardened, then releasing the optical glass lens set from the mold.

9. The optical glass lens set as claimed in claim 8, wherein the optical glass lens is a round glass lens or a rectangular lens.

10. The device as claimed in claim 8, wherein the lens holder is rectangular or round.

11. The optical glass lens set as claimed in claim 8, wherein the lens holder is made of opaque plastic material.

12. The optical glass lens set as claimed in claim 8, wherein area of the opening ring that covers the outer periphery of the optical glass lens further comprising the non-optical surface of the whole outer periphery.

13. The optical glass lens set as claimed in claim 8, wherein the optical glass lens having at least two optical lenses.

14. The optical glass lens set as claimed in claim 13, wherein the optical glass lens set further comprising a: separator disposed between the outer periphery of two optical glass lenses so as to form a certain optical distance that is corresponding to thickness of the separator between the optical surfaces of the two optical glass lenses.

* * * * *